United States Patent
Yuan et al.

(10) Patent No.: US 10,298,514 B2
(45) Date of Patent: *May 21, 2019

(54) SYSTEM AND METHOD FOR CLOUD CONNECTION POOL

(71) Applicant: Oracle International Corporation, Redwood Shores, CA (US)

(72) Inventors: Hong Yuan, Redwood City, CA (US); Tarun Jaiswal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,252

(22) Filed: Apr. 16, 2018

(65) Prior Publication Data

US 2018/0234352 A1 Aug. 16, 2018

Related U.S. Application Data (63) Continuation of application No. 14/106,681, filed on Dec. 13, 2013, now Pat. No. 9,948,571.

(Continued)

(51) Int. Cl.
*G06F 9/50* (2006.01)
*H04L 12/911* (2013.01)
*H04L 29/08* (2006.01)

(52) U.S. Cl.
CPC ............ *H04L 47/70* (2013.01); *G06F 9/5072* (2013.01); *H04L 67/10* (2013.01); *H04L 67/16* (2013.01); *G06F 2209/5011* (2013.01)

(58) Field of Classification Search
CPC ......... H04L 47/70; H04L 67/10; H04L 67/16; G06F 9/465; G06F 2209/5011
See application file for complete search history.

(56) References Cited

U.S. PATENT DOCUMENTS

2004/0225865 A1 11/2004 Cox
2004/0250248 A1 12/2004 Halpern
(Continued)

FOREIGN PATENT DOCUMENTS

EP 2 608 032 A1 6/2013

OTHER PUBLICATIONS

Stack Overflow, "Need Code to Create Connection Pool in Java" from the internet http://stackoverflow.com/questions/2826212/need-code-to-create-connection-pool-in-java, dated Jan. 21, 2015, 4 pages.

(Continued)

*Primary Examiner* — Michael A Keller
(74) *Attorney, Agent, or Firm* — Hickman Palermo Becker Bingham LLP (57) ABSTRACT

Today's cloud software, especially cloud management software, faces a complex, distributed, cross platform environment with extremely diversified software components. Cloud Connection Pool (CCP) is a technique to obtain a connection in such an environment and is more complex than a traditional connection pool. CCP allows requesting components to establish connections to target components. CCP uses cloud mapping data that associates cloud components with each other and stores pool data that identifies connection pools for components (or "managing components") that manage target components. In response to a request for a connection from a requesting component, the CCP determines a managing component that is associated with the requested target component and identifies (or creates) a connection pool that is associated with the managing component. The CCP then retrieves a connection from the connection pool and returns the connection to the requesting component.

16 Claims, 4 Drawing Sheets

Related U.S. Application Data (60) Provisional application No. 61/841,226, filed on Jun. 28, 2013.

(56) References Cited

U.S. PATENT DOCUMENTS

| | | |
|---|---|---|
| 2005/0038890 A1 | 2/2005 | Masuda |
| 2006/0146877 A1* | 7/2006 | Srivastava ............ G06F 9/5055 370/469 |
| 2008/0077264 A1 | 3/2008 | Irvin |
| 2008/0133729 A1 | 6/2008 | Fridman |
| 2012/0047239 A1* | 2/2012 | Donahue ............... G06F 9/5072 709/220 |
| 2012/0124217 A1 | 5/2012 | Bartley |
| 2012/0246316 A1 | 9/2012 | Ramu et al. |
| 2012/0278475 A1 | 11/2012 | Papakipos |
| 2012/0330991 A1 | 12/2012 | Babka et al. |
| 2013/0041931 A1 | 2/2013 | Brand |
| 2013/0144946 A1* | 6/2013 | Subramanian .......... H04L 63/10 709/204 |
| 2013/0254761 A1 | 9/2013 | Reddy |
| 2013/0268807 A1 | 10/2013 | Spencer |
| 2014/0019628 A1 | 1/2014 | Shankar |
| 2014/0123296 A1* | 5/2014 | Subramanian .......... H04L 67/10 726/26 |
| 2014/0129592 A1 | 5/2014 | Samudrala |
| 2014/0181306 A1 | 6/2014 | Kothamasu |
| 2015/0190714 A1 | 7/2015 | Smith |

OTHER PUBLICATIONS

Murphy, David, "JDBC Connection Pooling Best Practices" http://www.javaranch.com/journal/200601/JDBCConnectionPooling.html, Printed on Jan. 21, 2015, 6 pages.

Yuan, U.S. Appl. No. 14/106,681, filed Dec. 13, 2013, Notice of Allowance, dated Dec. 5, 2017.

Yuan, U.S. Appl. No. 14/106,681, filed Dec. 13, 2013, Interview Summary, dated Aug. 29, 2017.

Yuan, U.S. Appl. No. 14/106,681, filed Dec. 13, 2013, Final Office Action, dated Jun. 8, 2017.

U.S. Appl. No. 14/106,681, filed Dec. 13, 2013, Office Action, dated Dec. 15, 2016.

U.S. Appl. No. 14/106,681, filed Dec. 13, 2013, Office Action, dated Dec. 2, 2015.

U.S. Appl. No. 14/106,681, filed Dec. 13, 2013, Final Office Action, dated Apr. 1, 2016.

* cited by examiner

SYSTEM AND METHOD FOR CLOUD CONNECTION POOL

This application claims the benefit under 35 U.S.C. § 120 as a continuation of application Ser. No. 14/106,681, filed Dec. 13, 2013, which claims the benefit under 35 U.S.C. 119(e) of provisional application 61/841,226, filed Jun. 28, 2013, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE DISCLOSURE

The present disclosure relates to connection pools and, more specifically, to managing connection pools in a cloud environment.

BACKGROUND

A connection is a means by which a server and client communicate with each other. The client and the server may be on different computing devices or on the same computing device. A client uses a connection to send commands to, and receive replies from, a server.

A solution for client/server communication is a direct connection. One problem with direct connection technologies is that the number of connections that a server can support at one time is limited. If too many direct connections are made in a short time, then the performance of the server may decrease dramatically or the server can stop working completely. Another problem with direct connection technologies is that establishing a connection requires a significant amount of time relative to time required to service the request(s) requested through the connection. It is very inefficient for an application to create and close a connection each time the application needs a connection, for example, whenever the application needs to query data from the server.

To address these two problems, connection pooling has been developed. Connection pooling involves creating a set of connections with a server and sharing the connections among clients that require connections. Thus, when a client needs to send a request, the client retrieves a connection from the pool. When the client is finished, then the client returns the connection to the pool, where the connection becomes available for use by other clients. This connection pool improved client/server communication in a simple client/server environment. However, establishing connections between software components in a cloud environment is still quite challenging for cloud application developers.

The following lists some important differences, in terms of server connection, between a traditional application (such as a web application) and an application working in a complex cloud environment.

For a traditional application, the host, port, and protocol of a connection are relatively fixed and unlikely to change. In fact, a simple configuration file may be used to store such information. In contrast, for a cloud application, the host, port, and protocol need to be dynamically discovered because a cloud environment is distributed and dynamically changing.

For a traditional application, there is usually only one server that needs to be connected to for a single task. Even if the number of servers is greater than one, the total number is limited. In contrast, for a cloud application, for a single task, there may be hundreds or thousands of servers that need to be connected. For example, a cloud application may require a single task to change the SSL port of a server. On the surface, such a task appears very simple. However, in a cloud environment, there are hundreds of servers. Thus, this simple task may involve hundreds of instances—one instance corresponding to changing the SSL port of one particular server. Each instance is required to make only one connection. However, for the task as a whole, the task requires many different connections. Also, the number of servers may change (i.e., increase or decrease) dynamically. An application developer cannot limit how many servers there can be in a cloud environment.

For a traditional application, even if there is more than one server, the logic to decide which server to connect to is usually simple and fixed. In contrast, in a cloud environment, most target components (to which connections are sought) cannot be directly connected to for configuration and monitoring purposes.

For a traditional application, the server platform is usually predefined. In contrast, for cloud applications, different instances of a target component should be able to be run on a different platform, such as WebLogic, WebSphere, JBoss, etc. The same code to manage a cloud component (including getConnection( )code) needs to work for all supported platforms. The number of supported platforms may decrease/increase due to business decisions, where the change in the number of supported platforms may occur after the time when code to manage a software component is written.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for allowing software components executing in a cloud environment to obtain a connection to another software component executing in the cloud environment. A Cloud Connection Pool (CCP) uses mapping data to determine, from among multiple software components in a cloud environment, a particular software component to which a requesting component should connect. The mapping data used by the CCP is complex and changes from time to time to reflect the changes in the cloud environment itself. After identifying a target component to which a requesting component should connect, the CCP then uses another mapping to identify a connection pool for the target component, if such a connection pool already exists. If not, then the connection pool is created. The CCP comprises hardware or program logic to: (1) determine the correct connection pool from a client request for a connection; (2) call the selected connection pool to return connection to the client; and (3) create/maintain the set of connection pools that hold the connections for all cloud servers.

A CCP is two-tiered in the sense that a CCP contains a collection of connection pools. Upon request to return a connection, the CCP first searches for which connection pool is the target pool (first tier) and then calls the connection pool to return the connection (second tier).

A CCP is designed for a complex and advanced cloud computing environment. A CCP provides a simple interface to allow requesting components to obtain a connection to another cloud-managed component, even if the other cloud-managed component is (a) running on a different platform than the cloud management software or (b) not directly connectable.

Embodiments disclosed herein allow cloud management software to manage extremely diversified software components running in a distributed, cross-platform environment. In absence of embodiments disclosed herein regarding a cloud connection pool, software developers must settle for one of two solutions: either (a) make a direct connection to another software component or (b) use existing connection pool technology that only works for certain platforms and has limited functionality.

System Overview

Figure 1:
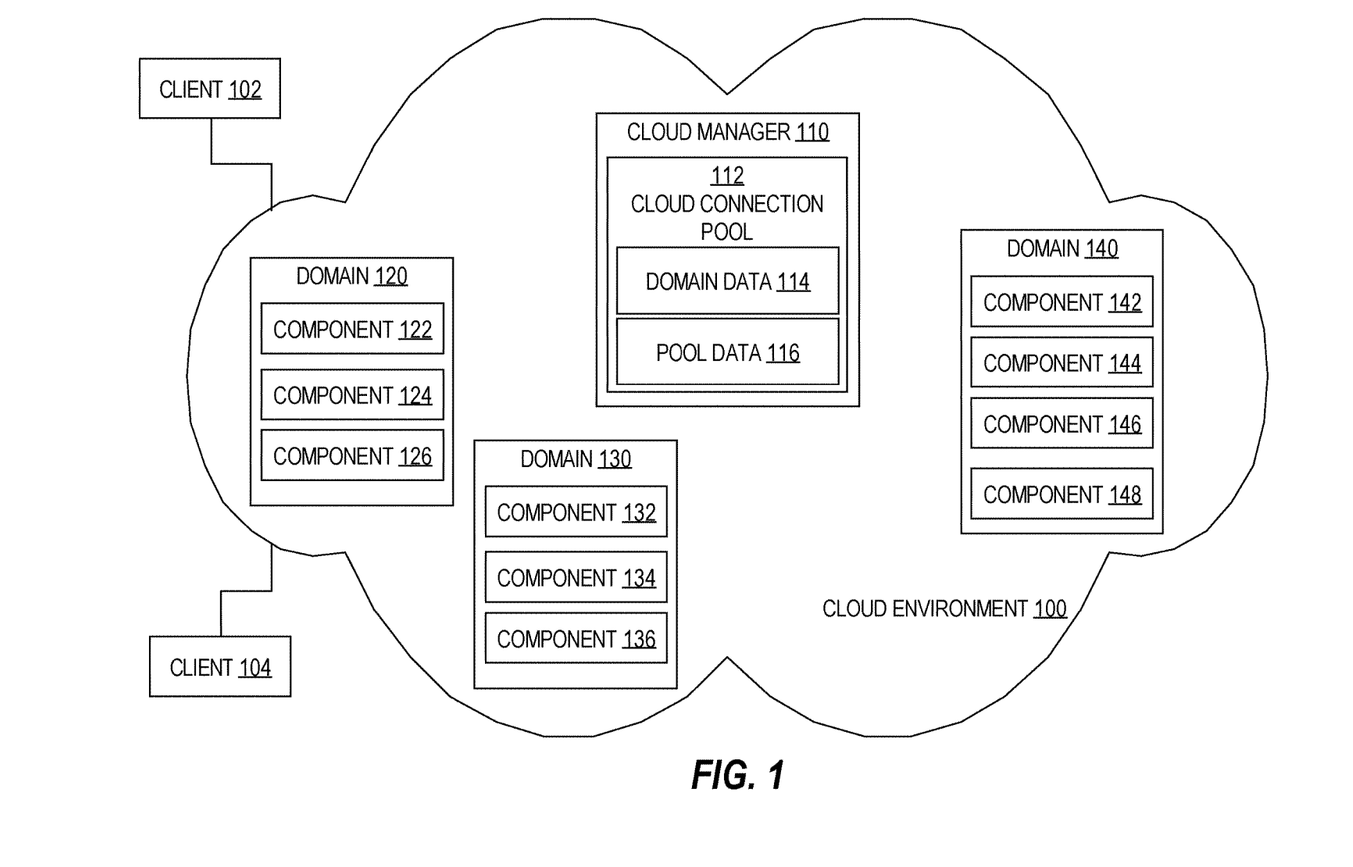
FIG. 1 is a block diagram that depicts an example cloud environment, in an embodiment.

FIG. 1 is a block diagram that depicts an example cloud environment 100, in an embodiment. Cloud environment 100 comprises numerous computing devices that host one or more services, each of which is provided by one or more software components. Cloud environment 100 may be managed by a single company or organization while the services hosted in cloud environment 100 are provided by different companies or organizations.

One or more client devices, such as client devices 102 and 104, are configured to discover one or more services hosted in cloud environment 100 and send (e.g., HTTP) requests to those services. A service is provided by one or more applications and, optionally, an application server that supports the one or more applications. An application is configured to respond to client requests and may require information from or processing by its associated application server. Example types of applications include customer relationship management (CRM), human capital management (HCM), and financial management.

An application server is a server dedicated to the efficient execution of procedures (programs, routines, scripts) for supporting one or more applications. An application server acts as a set of components accessible to a software developer through an API defined by a certain platform. For Web applications, the set of components are usually performed in the same running environment as its Web server(s), and the main job of the set of components is to support the construction of dynamic pages. However, an application server may target much more than just Web page generation. An application server may implement services such as data security, clustering, fail-over, and load-balancing so that developers of applications can focus on implementing the business logic of their respective applications.

In order to use the set of components provided by an application server, an application must establish a connection with the application server. A developer of the application may write the code necessary to establish the connection. This approach is referred to as "direct connection" and is not trivial. As noted previously, an alternative approach is referred to as connection pooling where the application server maintains a pool of multiple connections that are immediately available for applications that the application server supports.

Cloud Manager

Cloud environment 100 includes a cloud manager 110. Cloud manager 110 may be implemented in hardware, software, or any combination of hardware and software. In addition to providing connection services to managed components within cloud environment 100 through CCP 112, cloud manager 110 may provide one or more other services to hosted components, such as:

System Monitoring: status, charts, incidents, metrics, etc.
Groups Management: organize multiple targets into groups for easier management.
Software Library: software bits, patches, gold images, scripts stored in repository.
Deployment Procedures and Job System: Cloud automation framework for automating, orchestrating, and tracking tasks that can be run in a distributed environment; such tasks are referred to as "deployment procedure," which is a hierarchical sequence of steps, where each step may contain a sequence of other steps.
Compliance Management: compare user configuration with published standards and alert user of compliance violation.
Enterprise Configuration Management: configuration search, change history, and comparison.
Application Dependency and Performance Management
Cloud Provisioning: self-service provisioning, Chargeback (charge internal organization for resources used), capacity planning.
JVM Diagnostics: diagnose the root cause of performance problems in the production environment.
Database Management: monitoring and administration of a database and database clusters.
Middleware Management: Application Server, SOA, Identity Management, etc.
Application Management—CRM, HCM, etc.

Cloud manager 110 may execute on a single computing device or different instances of cloud manager 110 may execute on multiple computing devices.

Domains

In an embodiment, cloud environment 100 manages components from multiple domains 120-140. A domain (also referred to as a "cell") is a logically related group of software components that can communicate with at least one other component in the group. For example, domain 120 includes components 122-126, domain 130 includes components 132-136, and domain 140 includes components 142-148. Specifically, components 122-124 may be different instances of the same application and component 126 may be an application server that supports components 122-124.

Components 122-124 may seek a connection to component 126; components 132-134 may seek a connection to component 136; and components 142-146 may seek a connection to component 148. The software components of a domain belong to the same software platform.

Although only three domains are depicted in FIG. 1, cloud environment 100 may contain hundreds of domains.

Components in different domains usually do not communicate with each other, even if those components are of the same software platform. For example, component 122 may not communicate with any components in domains 130 or 140.

While a set of components may belong to the same domain, different components in the set may be hosted on different computing devices in cloud environment 100. An example of a set of components that belong to a domain is multiple instances of an email application and an administration server with which the email application instances communicate in order to update email filter settings for email accounts.

Examples of a software component that requests a connection include a log tracing management component and a JDBC data source management component, while an example of a software component for which a connection is sought is an application server.

Cloud Connection Pool

Cloud Connection Pool 112 provides connections to managed components in cloud environment 100 to allow those managed components to communicate with other managed components in cloud environment 100. The managed components that request a connection are referred to herein as "requesting components" and the managed components for which connections are sought are referred to herein as "target components." In some situations, a managed component may be a requesting component at one time and a target component at a different time.

Cloud Connection Pool 112 has access to cloud mapping data that indicates, for each domain of multiple domains, which components belong to that domain and stores pool data about how to return connections for the components. Thus, when a request to return a connection to a requesting component is received by Cloud Connection Pool (CCP) 112, CCP 112 may use the cloud mapping data to determine to which domain the requesting component should connect and then execute the required logic to return a connection.

Cloud mapping data may be stored in any form. For example, cloud mapping data may be stored in a relational table (the detailed design of which may vary from one implementation to another). Cloud mapping data may also be stored in hash maps in computer memory.

Cloud mapping data may be generated in response to discovering new managed components in cloud environment 100. The discovery or registration process involves retrieving, from the new managed components, information necessary to identify to which domain the managed components belong. An example of such information includes the following XML, data:

```
<Target TYPE="j2ee_application"
    NAME="/CUSTOMID/DOMAIN_A/Cluster_App_A"
    ON_HOST="host1.us.oracle.com"
    IDENTIFIER="TARGET_GUID=49997D18DD1389E93B8FD3E7A7596B09">
  <Property NAME="AppType" VALUE="ear"/>
  <Property NAME="version" VALUE="10.3.6.0"/>
  <AssocTargetInstance ASSOCIATION_NAME="farm"
    ASSOC_TARGET_NAME="/CUSTOMID/DOMAIN_A"
    ASSOC_TARGET_TYPE="weblogic_domain"/>
</Target>
```

This XML snippet indicates that the type of managed component is a J2EE application, that the name of the management component is Cluster_App_A, which is in domain A, that the host of the managed component is located at host1.us.oracle.com, that the managed components ID is 499997 . . . , and that the managed component has two properties ("AppType" and "version").

In an embodiment, one or more of the domains in cloud environment 100 include a software cluster that comprises multiple instances of an application. A software cluster provides redundancy in case an instance of the application in the cluster fails for any reason.

Cloud Connection Pool 112 also stores pool data 116 that indicates multiple pools of connections for managed components from different domains. Each domain is associated with one connection pool. Different domains may belong to the same software platform or may belong to different software platforms. A "software platform" as used herein is a software framework and middleware that hosts applications. A software platform may be built on open standards and technologies, such as Java EE, XML, and Web Services. Example software platforms include Web Sphere, WebLogic, and JBoss. For example, the components in domain 120 may correspond to a platform A and the components in domains 130 and 140 may correspond to a platform B, which is different than platform A.

In response to receiving, from a requesting component, a request for a connection, Cloud Connection Pool 112 identifies the component that is associated with the request (i.e., the target component). Then Cloud Connection Pool 112 uses cloud mapping data to identify the domain to which the connection should be made. Cloud Connection Pool 112 then identifies a particular pool associated with the identified domain, if a pool exists, from which to retrieve a connection. If a connection is available from the particular pool, then Cloud Connection Pool 112 returns the connection to the requesting component. If no pool exists yet for the domain, then Cloud Connection Pool 112 creates a pool and creates one or more connections for that pool.

Thus, Cloud Connection Pool 112 provides a simple interface for multiple managed software components in cloud environment 100; thus, shielding a cloud application developer from the complexity of cloud environment 100 and many related issues. For example, an application developer does not have to worry about keeping track of where a target component might be located (i.e., hostname, port number, protocol). Instead, a requesting component only needs to invoke a single function and, optionally, pass a single identifier that identifies the requesting component.

Also, in an embodiment, with Cloud Connection Pool 112, applications may employ Cloud Connection Pool 112 in obtaining a connection with the appropriate target component in different platforms.

As an example, a software component might need to change an SSL listen port for an application server. In order to make that change, the software component needs to obtain a connection. However, a connection to the application server itself cannot change the configuration of the server. Instead, the connection needs to be made to an administrative server that manages the application server. Thus, the CCP first determines to which domain the administrative server belongs. Then, the CCP uses the domain information to determine whether a connection pool for the administrative server of the domain exists. If such a connection pool does exist, then the CCP calls the connection pool to return a connection. If such a connection pool does not exist, then the CCP first creates the connection pool and then returns the connection.

Thus, with Cloud Connection Pool 112, software developer can avoid (1) the numerous requirements related to making a proper connection to a managed software component along with (2) the significant cost associated with identifying, implementing, and verifying these requirements.

Without Cloud Connection Pool 112, due to the extreme complexity related to obtaining a connection in a complex cloud environment, the functionality of cloud management software would likely be compromised.

Example Process

Figure 2A:
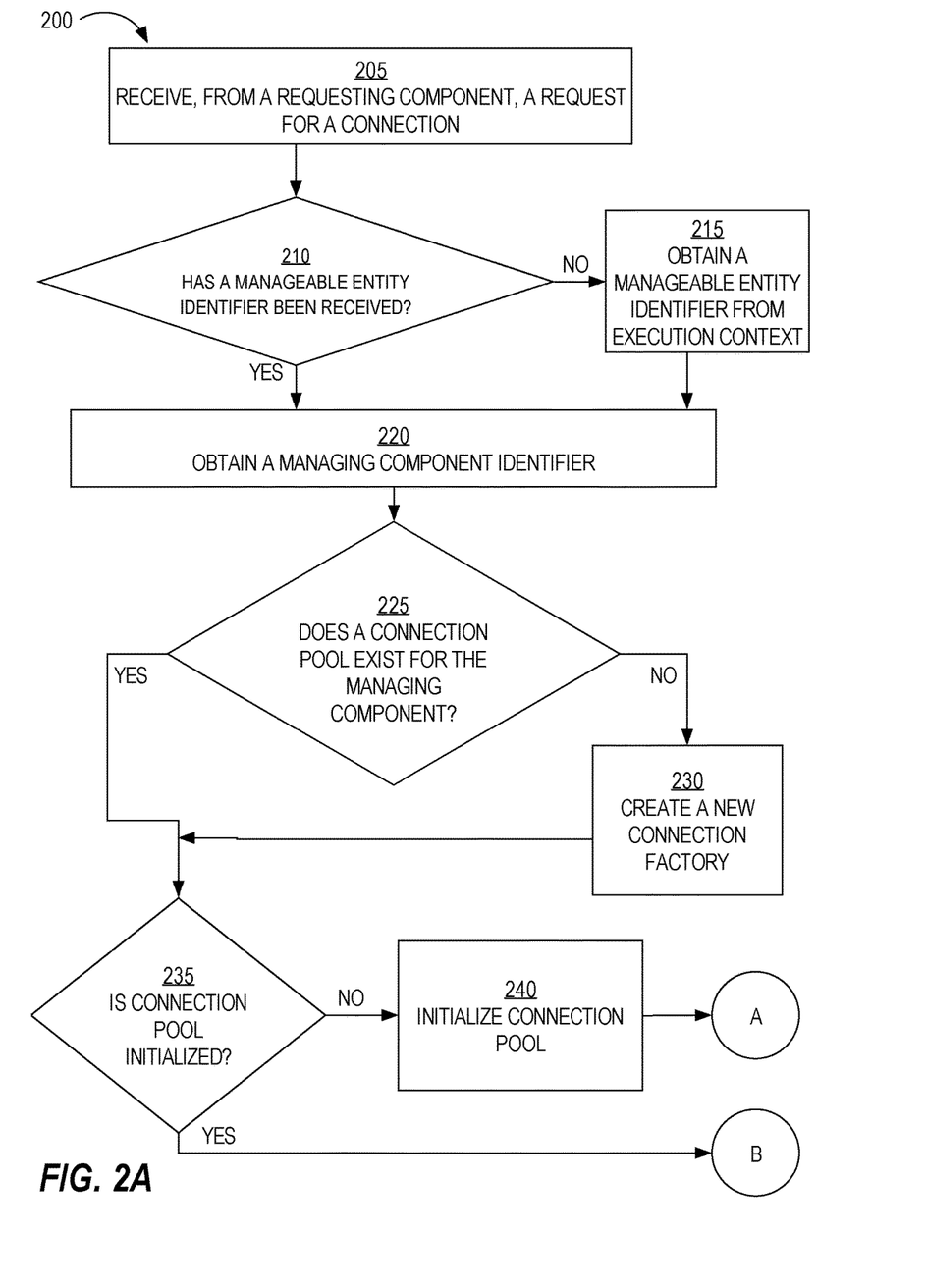
FIGS. 2A-2B are flow diagrams that depict a process for responding to requests for connections, in an embodiment.
Figure 2B:
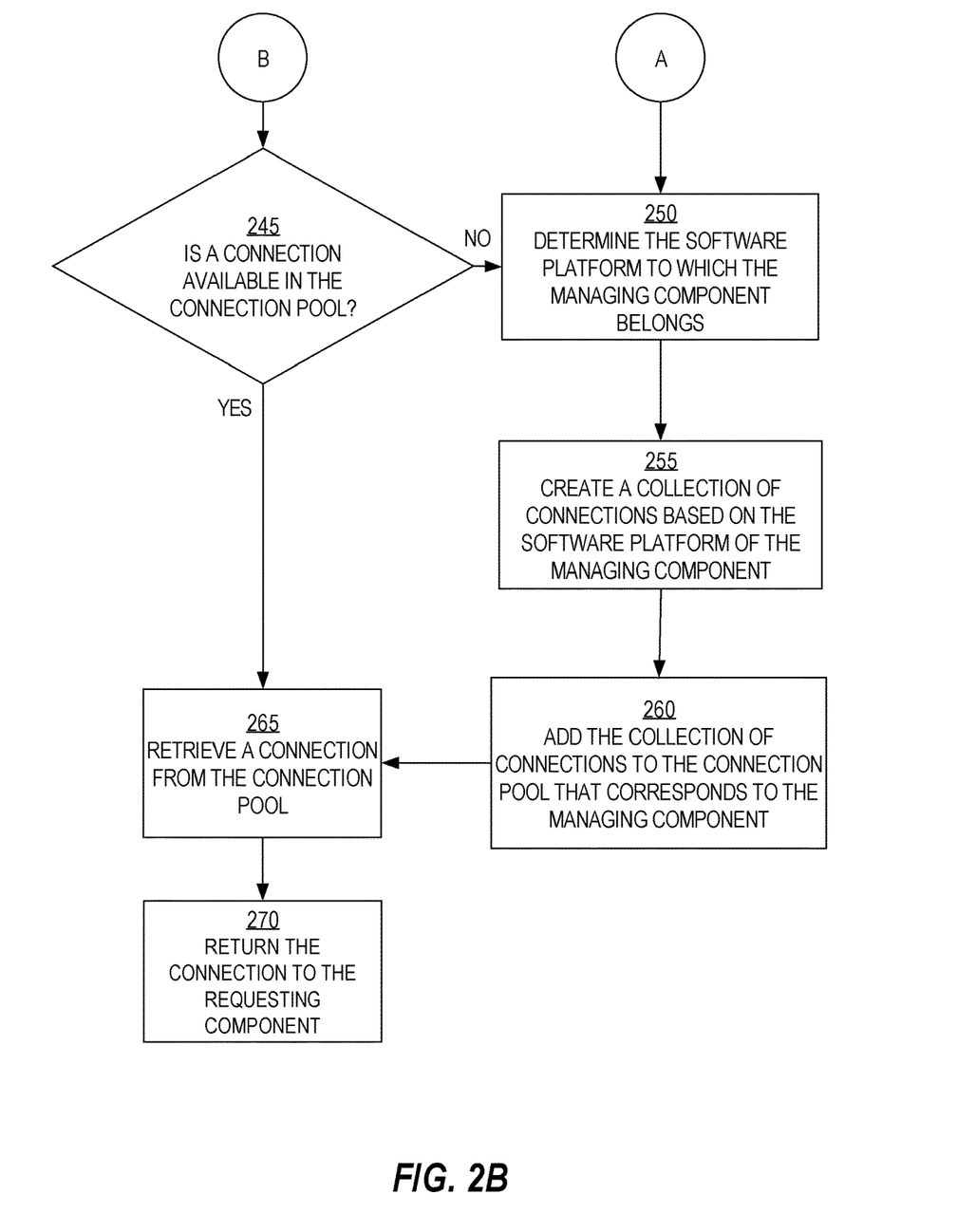

FIGS. 2A-2B are flow diagrams that depict a process 200 for responding to requests for connections, in an embodiment. Process 200 may be performed by Cloud Connection Pool 112 in cloud environment 100. While process 200 indicates that certain blocks are performed in a certain order, some embodiments may involve performing some of the step in a different order.

At block 205, a request for a connection is received from a requesting component. The requesting component is a component in the cloud environment, such as component 124 or component 136. The requesting component may have initiated the request by extending a base object and calling a single function (e.g., "getConnection( )"). Alternatively, the requesting component may call a static method, such as:

Connection
  conn=SDKClassName.getConnectionFromCloudPool(componentID);

There are numerous examples of a requesting component wanting to establish a connection. For example, the requesting component may send a request to change a log level of the WebLogic server. An identifier for the WebLogic server may be the only information that the requesting component "knows" about the server side.

At block 210, it is determined whether an identifier (ID) for a target component (or "manageable entity") has been received in the request. In the example above, the request (or function call) includes an identifier for the WebLogic server. If the request does not include a manageable entity ID, then process 200 proceeds to block 215 where the manageable entity ID is determined from the execution context in which the request was received. For example, if the request is made in a web application servlet context, then the manageable entity ID may be passed by standard HTTP parameters, such as /appl/servlet1?targetID=223344556677. In this example, a standard Java API call is able to retrieve the manageable entity ID. The API call may be as follows:

String componentsID=request.getParameter("targetID");

At block 220, a managing component ID is identified for the manageable entity. Many manageable entities (or target components) cannot be directly connected to for configuration and monitoring purposes. Instead, a managing component needs to be located to perform management operations on the manageable entity. Thus, extra logic is needed to determine where the managing component is located and how to connect to the managing component. Such logic is based on a dynamically changing cloud environment. Cloud mapping data that maps managing components to target components needs to be discovered and updated from time to time.

Block 220 may involve determining a domain based on the manageable component ID. Thus, in an embodiment, the managing component of a manageable entity is a domain. For example, Cloud Connection Pool 112 may use a discovery cache that maps manageable entities to domains. In the example above where the manageable entity is a WebLogic server, a managing component for the WebLogic server is a WebLogic Domain.

In an embodiment, a target component does not have a managing component. Instead, a connection is made directly between a requesting component and a target component. In a sense, such a target component may also be considered a managing component. An example of target component with which a direct connection is made is a database component and the direct connection is a database connection. Thus, block 220 may involve identifying and returning an identifier for the manageable entity.

At block 225, it is determined whether a connection pool exists for the managing component identified by the managing component ID. For example, Cloud Connection Pool 112 maintains "global" pool data that maps each of multiple managing component IDs to a different connection pool. The global pool data may store data about each connection pool that is maintained by Cloud Connection Pool 112. The global pool data may be stored in a hash table in memory. For example, each entry in a global pool table may identify a different connection pool. The entry may be used to identify (e.g., using a connection pool identifier) another table, such as a specific connection pool table, that stores information about one or more connections that have been created for the identified connection pool. For example, each entry in the specific connection pool table corresponds to a different connection and indicates whether the connection is currently being used (or, in other words, is unavailable for the current request) or is not currently being used (or, in other words, is available for the current request).

If, as described above with respect to block 220, there is no managing component, then block 225 involves determining whether a connection pool exists for the target component.

If it is determined that a connection pool has been created for the managing component (or, in the case of no managing component, for the target component), then process 200 proceeds to block 235. Else, process 200 proceeds to block 230, where a new connection factory is created. Block 230 may involve creating a connection factory object that includes methods to create a connection. Such methods may take no parameter values or may take one or more parameters, such as, a name and a password of the requesting user.

At block 235, it is determined whether a connection pool associated with the connection factory of the managing component is initialized. If a new connection factory was newly created in process 200, then the connection pool will not have been initialized. Thus, if the determination in block 235 is negative, then process 200 proceeds to block 240, where a connection pool is initialized.

At block 245, it is determined whether a connection is available in the connection pool. If so, then process 200 proceeds to block 265 where a connection is retrieved from the connection pool and then to block 270 where the connection is (or connection details are) sent to the requesting component. If it is determined that the connection pool does not have an available connection, then process 200 proceeds to block 250.

At block 250, the software platform to which the managing component belongs is determined. For example, block 250 may involve determining that the managing component is a Web Sphere component, a WebLogic component, or a JBoss component. Each managing component may have a different target type, which is part of the ID of the managing component. Thus, determining the software platform may simply involve determining the target type.

At block 255, a collection of one or more connections is created based on the software platform determined in block 250. Each software platform has different requirements for creating a connection that is to be used by requesting components. The number of connections that are in the collection that is created in block 255 may be depend on whether connections have been created before for the software platform determined in block 250. If this performance of block 255 is the first time it is performed with respect to the software platform (i.e., no connection has been created before for the software platform determined in block 250), then the number of connections in the collection may be a first number, such as 90. If this performance of block 255 is not the first time it is performed with respect to the software platform (i.e., multiple connections have been created before for the software platform determined in block 250), then the number of connections in the collection may be a second number, such as 10.

At block 260, the collection of one or more connections is added to the connection pool that corresponds to the managing component. Block 260 may involve storing details about the connection in a connection pool table (or other object) that corresponds to the managing component. Process 200 then proceeds to block 265 where the connection is retrieved from the connection pool.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
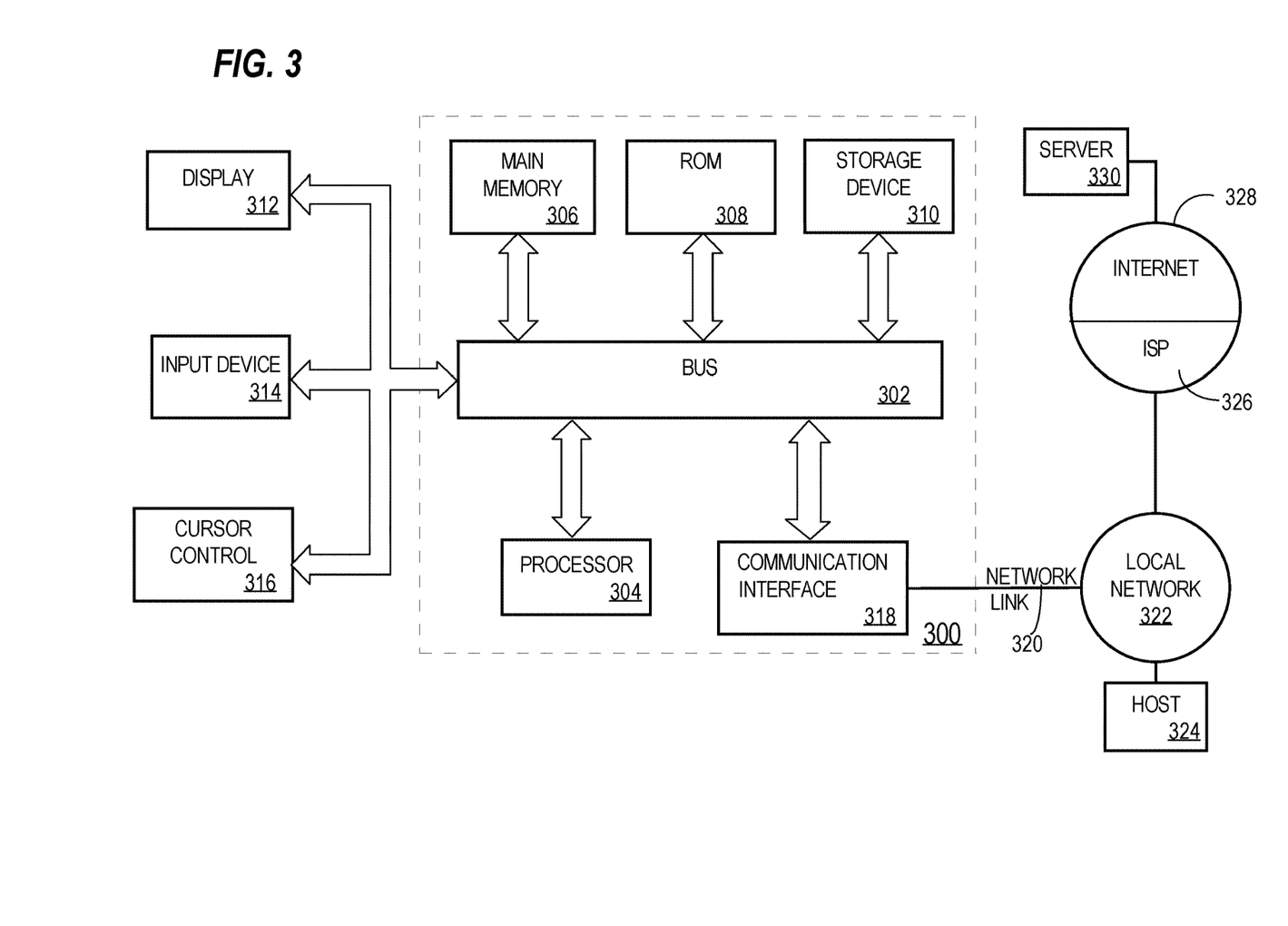
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving, from a requesting component, a request for a connection to a component;
   based on the request, determining a target component for the connection of the requesting component;
   identifying, based on the target component, a particular domain, from among a plurality of domains, to which the target component belongs;
   determining, from among a plurality of managing components that are different than the target component and that belong to different domains, a managing component that is associated with the target component and with the particular domain;
   identifying, from among a plurality of connection pools, a connection pool for the managing component;
   determining whether the connection pool for the managing component is not initialized;
   if the connection pool for the managing component is determined not to be initialized, initializing the connection pool for the managing component;
   determining whether the connection pool includes a certain connection that is available;
   if the certain connection is determined to be available in the connection pool, providing the certain connection to the requesting component.

2. The method of claim 1, further comprising:
   prior to identifying the connection pool for the managing component, determining whether the connection pool exists for the managing component;
   if no connection pool is determined to exist for the managing component, creating the connection pool.

3. The method of claim 2, further comprising:
   creating the certain connection for the connection pool and adding the certain connection to the connection pool.

4. The method of claim 1, wherein the requesting component is a first requesting component, the method further comprising:
   receiving, from a second requesting component that is different than the first requesting component, a second request for a connection to a second target component;
   in response to receiving the second request, determining, from among the plurality of managing components, that the managing component is associated with the second requesting component;
   determining whether the connection pool includes one or more connections that are available;
   if a second connection is determined to be available in the connection pool, providing the second connection to the second requesting component.

5. The method of claim 1, further comprising:
   determining a particular identifier for the component based on an execution context of the request;
   determining the target component based on the particular identifier.

6. The method of claim 1, further comprising, prior to identifying the connection pool for the managing component:

storing pool data that identifies:
for each managing component of the plurality of managing components, a respective connection pool that is associated with said each managing component;
for each connection pool of the plurality of connection pools, data about one or more connections that belong to said each connection pool;
determining, based on the pool data, whether the connection pool exists for the managing component.

7. The method of claim 1, further comprising storing cloud mapping data that associates domains with components, wherein the cloud mapping data associates the managing component with the particular domain.

8. The method of claim 6, wherein determining the managing component that is associated with the target component and with the particular domain is based on the cloud mapping data.

9. One or more non-transitory computer-readable media storing instructions, which when executed by one or more processors, cause:
receiving, from a requesting component, a request for a connection to a component;
based on the request, determining a target component for the connection of the requesting component;
identifying, based on the target component, a particular domain, from among a plurality of domains, to which the target component belongs;
determining, from among a plurality of managing components that are different than the target component and that belong to different domains, a managing component that is associated with the target component and with the particular domain;
identifying, from among a plurality of connection pools, a connection pool for the managing component;
determining whether the connection pool for the managing component is not initialized;
if the connection pool for the managing component is determined not to be initialized, initializing the connection pool for the managing component;
determining whether the connection pool includes a certain connection that is available;
if the certain connection is determined to be available in the connection pool, providing the certain connection to the requesting component.

10. The one or more non-transitory computer-readable media of claim 9, wherein the instructions include instructions, which when executed on said one or more processors, further cause:
prior to identifying the connection pool for the managing component, determining whether the connection pool exists for the managing component;
if no connection pool is determined to exist for the managing component, creating the connection pool.

11. The one or more non-transitory computer-readable media of claim 10, wherein the instructions include instructions, which when executed on said one or more processors, further cause:
creating the certain connection for the connection pool and adding the certain connection to the connection pool.

12. The one or more non-transitory computer-readable media of claim 9, wherein the requesting component is a first requesting component, and wherein the instructions include instructions, which when executed on said one or more processors, further cause:
receiving, from a second requesting component that is different than the first requesting component, a second request for a connection to a second target component;
in response to receiving the second request, determining, from among the plurality of managing components, that the managing component is associated with the second requesting component;
determining whether the connection pool includes one or more connections that are available;
if a second connection is determined to be available in the connection pool, providing the second connection to the second requesting component.

13. The one or more non-transitory computer-readable media of claim 9, wherein the instructions include instructions, which when executed on said one or more processors, further cause:
determining a particular identifier for the component based on an execution context of the request;
determining the target component based on the particular identifier.

14. The one or more non-transitory computer-readable media of claim 9, wherein the instructions include instructions, which when executed on said one or more processors, further cause, prior to identifying the connection pool for the managing component:
storing pool data that identifies:
for each managing component of the plurality of managing components, a respective connection pool that is associated with said each managing component;
for each connection pool of the plurality of connection pools, data about one or more connections that belong to said each connection pool;
determining, based on the pool data, whether the connection pool exists for the managing component.

15. The one or more non-transitory computer-readable media of claim 9, wherein the instructions include instructions, which when executed on said one or more processors, further cause storing cloud mapping data that associates domains with components, wherein the cloud mapping data associates the managing component with the particular domain.

16. The one or more non-transitory computer-readable media of claim 15, wherein determining the managing component that is associated with the target component and with the particular domain is based on the cloud mapping data.

* * * * *

UNITED STATES PATENT AND TRADEMARK OFFICE
CERTIFICATE OF CORRECTION

PATENT NO. : 10,298,514 B2  
APPLICATION NO. : 15/954252  
DATED : May 21, 2019  
INVENTOR(S) : Yuan et al.

Page 1 of 1

It is certified that error appears in the above-identified patent and that said Letters Patent is hereby corrected as shown below:

In the Specification

In Column 6, Line 5, delete "XML," and insert -- XML --, therefor.

In Column 6, Line 40, delete "Web Sphere," and insert -- WebSphere, --, therefor.

In Column 7, Line 65, delete "/appl/" and insert -- /app1/ --, therefor.

In Column 8, Line 1, delete "componentsID" and insert -- componentID --, therefor.

In Column 9, Line 17, delete "Web Sphere" and insert -- WebSphere --, therefor.

In the Claims

In Column 13, Line 13, in Claim 8, delete "claim 6," and insert -- claim 7, --, therefor.

Signed and Sealed this  
Twenty-eighth Day of July, 2020

Andrei Iancu  
*Director of the United States Patent and Trademark Office*